July 8, 1958 H. A. CHISHOLM 2,842,281
ELECTRIC OUTLET BOX ATTACHMENT
Filed Oct. 15, 1956
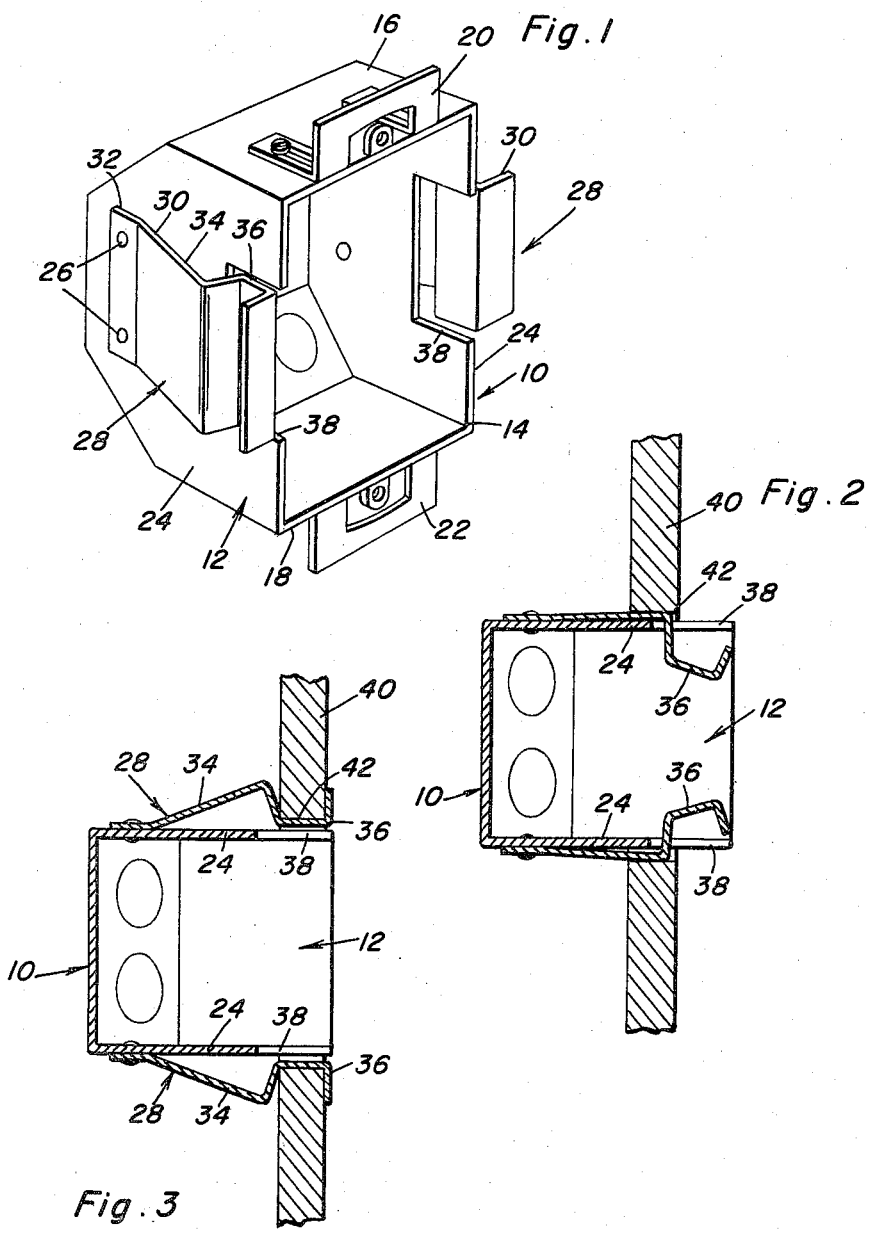
Homer A. Chisholm
INVENTOR.

United States Patent Office 2,842,281
Patented July 8, 1958

2,842,281

ELECTRIC OUTLET BOX ATTACHMENT

Homer A. Chisholm, Vernon, Tex., assignor of one-third to Cleddie A. Palmer, Vernon, Tex.

Application October 15, 1956, Serial No. 615,878

2 Claims. (Cl. 220—3.6)

This invention relates in general to new and useful improvements in electrical fittings, and more specifically to an improved electric outlet box.

Electric outlet boxes are normally mounted in walls either by attachment to a stud of the wall or by attachment to the plaster surface. However, in dry wall construction only plaster board is used and if an electric outlet box is to be carried by the wall material in lieu of the supporting frame for the wall, it is necessary that special fittings be utilized. These fittings, while relatively inexpensive, require the unnecessary expenditure of time and do not rigidly mount the electric outlet box as desired.

It is therefore the primary object of this invention to provide an electric outlet box attachment which is of such a nature whereby it may be used for the purpose of mounting an electric outlet box in a plaster board wall with a minimum expenditure of time and effort.

Another object of this invention is to provide an electric outlet box attachment for use in conjunction with walls formed of plaster board, the outlet box attachment including spring clip-like members disposed on opposite sides of an outlet box, the members having sockets which receive portions of the plaster board which define the opening in which the outlet box is disposed.

A further object of this invention is to provide an improved electric outlet box which has mounted thereon spring retaining members, the spring retaining members being so constructed whereby it is merely necessary to push the outlet box through an opening in a plaster board wall and the spring retaining members will automatically retain the outlet box in the plaster board.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a conventional type of electric outlet box which is provided with the attaching means which are the subject of this invention;

Figure 2 is a transverse horizontal sectional view taken through a plaster board wall and shows the outlet box of Figure 1 in the process of being positioned in an opening in the plaster board wall; and Figure 3 is a fragmentary horizontal sectional view similar to Figure 2 and shows the electric outlet box positioned in the plaster board wall.

Referring now to the drawings in detail, it will be seen that there is illustrated in Figure 1 a conventional outlet box for electrical work, the electric outlet box being referred to in general by the reference numeral 10. The outlet box 10 includes a box-like container 12 which has an open front end 14. The container 12 includes a top wall 16 and a bottom wall 18. Carried by the top wall 16 and the bottom wall 18 are adjustable stop members 20 and 22, respectively.

The container 12 also includes side walls 24. Secured to the rear portions of the side walls 24 by means of fasteners 26 is a pair of retaining members 28. Each of the retaining members 28 is in the form of a resilient strap 30 which has a flat rear mounting flange 32 through which the fasteners 26 pass. Each strap 30 also includes a ramp-like intermediate portion 34 which slopes outwardly away from its respective side wall 24. Integrally connected to the forward part of the ramp-like portion 34 is an outwardly open channel shaped cross-sectional socket 36.

It is to be noted that the side walls 24 of the container 12 are cut away to provide openings 38, the openings 38 being aligned with the retaining members 28 and opening through the front face of the container 12.

When it is desired to mount the outlet box 10 in a plaster board wall, such as the wall 40, it is merely necessary to provide an opening 42 of the desired cross-section. The entire outlet box 10 is inserted through the opening 42. As the retaining members 28 pass through the opening 42, the ramp portions 34 thereof engage the sides of the opening 42 and move the socket portions 36 into the confines of the container 12.

As the electric outlet box 10 moves through the opening 42, the ramp-like portions 34 ride over the plaster board wall 40 and when the sockets 36 become aligned therewith, the retaining members 28 snap back to their original positions with the portions of the plaster board wall 40 defining vertical edges of the opening 42 being received in the sockets 36. Thus it will be readily apparent that as the electric outlet box 10 is moved through the opening 42, once it reaches its proper position, the retaining members 28 automatically grip the plaster board wall 40 to securely position the electric outlet box 10 therein. Since the electric outlet box 10 may be snapped into place with a minimum of effort, it will be readily apparent that the retaining members 28 have a definite advantage over prior electric outlet box retaining devices. At this time, it is pointed out that the members 20 and 22 could be dispensed with if desired. However, they do serve somewhat to position the container 12 with respect to the plaster board wall 40.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with a wall panel, said wall panel having an opening therein, a container, means for mounting said container in said wall panel opening, said container including opposite walls having rear portions and front edges, said mounting means comprising a pair of wide resilient straps secured to outer faces of said container walls along said rear portions, said resilient straps having outwardly opening oppositely directed wall panel receiving socket portions, base portions connected along the rear portions of said container walls, an intermediate portion of said resilient straps bent outwardly and forwardly and connecting said wall panel receiving socket portions and said bases and overlying an intermediate portion of said container walls whereby the intermediate portions of said side walls provide inward limiting stops for said straps so that the latter will be prevented from being moved into a position wherein the elastic limit is exceeded, openings on forward portions of said container walls aligned with said resilient straps of slightly larger dimensions than said wall panel receiving socket portions and receiving said wall panel receiving socket portions of said resilient straps when said container is being inserted in said wall panel opening, said openings being substantially closed by said wall panel receiving socket portions of said resilient straps, said resilient straps including forwardmost flanges defining forward boundaries of said sockets, said flanges and said front edges being coplanar, said wall panel receiving socket portions of said resilient straps engaging the perimeter of said wall panel opening and anchoring said container to said wall when said container has been inserted into position in said wall panel opening.

2. An electric outlet box for attachment to an opening in a wall panel comprising a container, means for mounting said container in a wall panel opening, said container including opposite walls having rear portions and front edges, said mounting means comprising a pair of wide resilient straps secured to outer faces of said container walls along said rear portions, said resilient straps having outwardly opening oppositely directed wall panel receiving socket portions, base portions of said resilient straps connected along the rear portions of said container walls, and intermediate portions of said resilient straps bent outwardly and forwardly and connecting said wall panel receiving socket portions and said bases and overlying an intermediate portion of said container walls whereby the intermediate portions of said side walls provide inward limiting stops for said straps so that the latter will be prevented from being moved into a position wherein the elastic limit is exceeded, openings on forward portions of said container walls aligned with said resilient straps of slightly larger dimension than said wall panel receiving socket portions and receiving said wall panel receiving socket portions of said resilient straps when said container is being inserted into a wall panel opening, said openings being substantially closed by said wall panel receiving socket portions of said resilient straps, said resilient straps including forwardmost flanges defining forward boundaries of said sockets, said flanges and said front edges being coplanar.

References Cited in the file of this patent
UNITED STATES PATENTS

| | | |
|---|---|---|
| 2,520,725 | Judd | Aug. 29, 1950 |
| 2,605,806 | Tinnerman | Aug. 5, 1952 |
| 2,769,562 | Rudolph | Nov. 6, 1956 |